United States Patent [19]

Erb

[11] 3,913,077

[45] Oct. 14, 1975

[54] SERIAL-PARALLEL-SERIAL CCD MEMORY WITH INTERLACED STORAGE

[75] Inventor: Darrell M. Erb, Newport Beach, Calif.

[73] Assignee: Hughes Aircraft Company, Culver City, Calif.

[22] Filed: Apr. 17, 1974

[21] Appl. No.: 461,687

[52] U.S. Cl. .............. 340/173 R; 340/172.5; 328/37

[51] Int. Cl.[2] .............. G11C 11/40

[58] Field of Search .............. 340/173 R; 328/37

[56] References Cited

UNITED STATES PATENTS

| | | | |
|---|---|---|---|
| 3,174,106 | 3/1965 | Urban | 340/173 R |
| 3,763,480 | 10/1973 | Weimer | 340/173 R |
| 3,797,002 | 3/1974 | Brown | 340/173 R |

*Primary Examiner*—Terrell W. Fears

*Attorney, Agent, or Firm*—Joseph E. Szabo, Esq.; W. H. MacAllister, Esq.

[57] ABSTRACT

A CCD memory device having on a single chip a parallel multi-channel storage section into which data is fed by a serial input register and from which data is read by a serial output register. Although at least two storage electrodes are needed throughout the memory to store each bit of information, the total number of such electrodes required in the input and output registers is greatly reduced by alternately storing the input and output bits at even and odd numbered storage electrodes of the input and output registers, so that each storage electrode may serve a separate channel of the parallel storage section.

13 Claims, 10 Drawing Figures

SERIAL-PARALLEL-SERIAL CCD MEMORY WITH INTERLACED STORAGE

BACKGROUND OF THE INVENTION

The present invention relates generally to CCD memories and, more particularly, to such memories of the type in which information is read into and out of a parallel storage section by means of serial registers. Memories of this type are commonly referred to as serial-parallel-serial.

CCDs are by now widely recognized as an important technology for the fabrication of microminiature electronic memories and shift registers. Exemplary of the patent literature on the subject is Smith U.S. Pat. No. 3,761,744 which describes a CCD shift register, Kosonocky U.S. Pat. No. 3,720,922 which describes a CCD memory system, and Krambeck U.S. Pat. No. 3,739,240 which explains the superiority of CCDs having buried channels in which charge is processed in the bulk of the semiconductor material rather than at its interface with the overlying oxide layer. Also pertinent are M. F. Tompsett, "Charge Transfer Devices," J. Vac. Sci. Technology, Volume 9, page 1166–1181; July-August 1972, and Collins, Barton, Buss, Kmetz, and Schroeder; "CCD Memory Options," ISSCC, pages 136, 137, and 210, February 1973, both of which articles describe serial-parallel-serial CCD memories.

In a serial-parallel-serial CCD memory, the data is clocked serially into an upper CCD shift register from which it is transferred to an array of vertically extending channels in a parallel storage section, wherein it is shifted downward, a line of data at a time, toward a second shift register located at the bottom of the parallel storage section. Upon transfer from the bottom of the parallel channels into the output shift register, the data, which is of course in the form of charge packets, is serially shifted out.

Assuming that a two-phase clock is used, two storage sites created by two storage electrodes are required in the serial shift registers to hold each charge packet at a given time so that, after clocking in the data, charge packets are stored at alternate storage sites in the input shift register. Thus, it has been necessary heretofore to align respective channels of the parallel storage register with alternate storage electrodes of the serial shift register. Moreover, with a three or higher phase clock, three storage sites or more are required to store each charge packet.

It is a principal object of the present invention to increase the bit density of serial-parallel-serial CCD memories, thereby reducing the required chip area and increasing yield.

In a two-phase clock operated memory the above object is attained in accordance with the present invention by allocating a channel of the parallel storage array to each storage electrode of the input and output shift registers. A "line" of data which is to be processed through the register is serially clocked in twice. The first time the data is clocked into a first set of alternate storage sites in the input shift register after which data is clocked in a second time so as to be registered in a second set of alternate storage sites in the input shift register. Thereafter, all of the data which had been read into the input shift register is shifted along the parallel channels of the parallel storage section until it reaches the output shift register where the process is similar to that which occurred during read-in time but in reverse.

The above arrangement cuts in half the number of storage sites required in the serial registers for a parallel storage section of a given number of channels. More importantly, it permits the size of the parallel storage section to be cut significantly. This is so because, with previous types of serial-parallel-serial memories, the width of the parallel storage section was much greater than it needed to be so far as its storage capacity was concerned, simply to accommodate the necessary length of the serial input and output registers which was dictated by the fact that two storage sites were required in the serial register for each channel of the parallel storage section.

An even greater saving is possible with higher order clocks. Thus, with a three-phase clock, data is read into the input register in three steps. During each step one-third of the total charge packets destined for a row of storage sites in the parallel storage section is read into a different one-third of the input register storage sites. First, those opposite the third, sixth, ninth, etc., channels would receive a charge packet, then those opposite the second, fifth and eighth channels and, last, those opposite channels 1, 4 and 7.

Further features and advantages will become apparent from the following detailed description and drawings in which.

Figure 1:
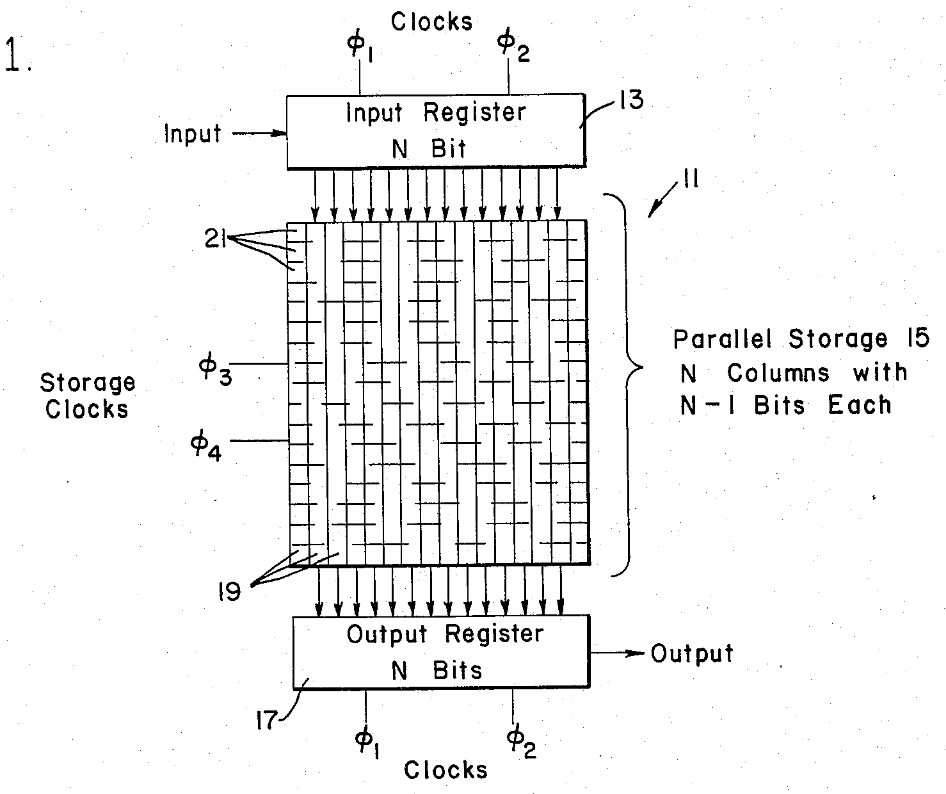
FIG. 1 is a simplified block diagram of a current type of serial-parallel-serial register.

Turning now to the figures, the organization of a basic two-phase serial-parallel-serial (SPS) CCD memory 11 is shown in FIG. 1. It will be noted that FIG. 1 shows a total of four clock phases being applied to the memory. What is meant herein by a "two-phase" or "three-phase" memory is that each memory section runs on two or three clock phases, so that in each memory section charge packets are stored at every second or third storage site at any particular time. The memory is fabricated in a single semiconductor chip whose size is typically less than 150 mils square. It consists of three basic and closely related sections: an input register 13, a parallel storage register 15, and an output register 17.

For an N-bit memory it is preferred for minimum power consumption to have a square array. Therefore, there should be $\sqrt{N}$ channels, each having a $\sqrt{N}-1$ bit storage capacity and the input and output registers should be $\sqrt{N}$ bits long. Data are first clocked into the input register 13. When the input register is full, the data are dumped in parallel into the respective channels 19 of the parallel storage section 15. The data are then transferred row by row 21 in the parallel storage section until they reach the output register 17 where they are read out serially.

Figure 2:
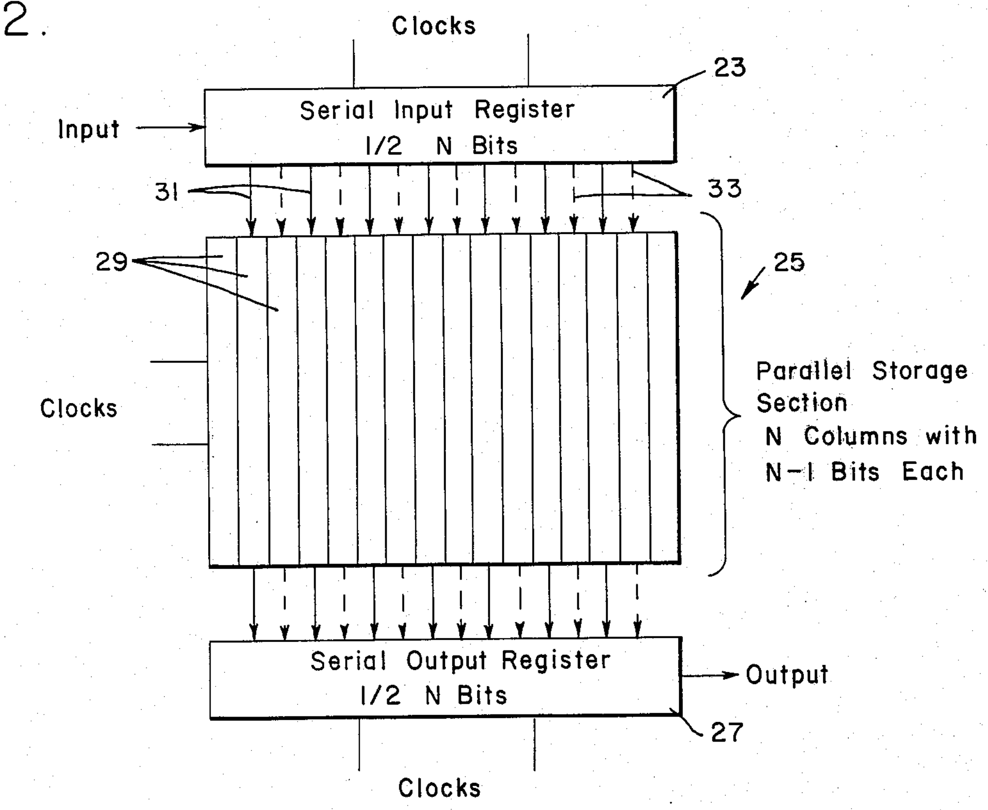
FIG. 2 is a simplified block diagram of a serial-parallel-serial register incorporating features of the present invention.

An SPS CCD memory featuring an interlaced two-phase storage array is illustrated in FIG. 2. It resembles the memory of FIG. 1 in that it, too, has a serial input register 23, a parallel storage register 25, and a serial output register 27. Moreover, its parallel storage section is again shown with $\sqrt{N}$ columns, each having $\sqrt{N}-1$ bits storage capacity. Significantly, however, its serial input and output registers 23 and 27 are only half as long in the number of bits which they can store at one time as those of the prior art memory 11. Each row of data which is to be processed line by line along the parallel storage section 25 are clocked in two steps. First, those bits of data which are destined for a first set of alternate channels (such as the odd numbered channels) 29 are clocked into a first set of alternate storage sites in the input register 23 and, in keeping with the invention, are transferred along the solid transfer lines 31 to a temporary storage site in their associated parallel channels 29 in the parallel storage section 25. Then, the second half of the data is clocked into the input register 23, but it is clocked into a second set of alternate storage sites in that register which are interlaced with the first set of storage sites. From those storage sites, the second half of the clocked-in data is transferred over the dashed transfer lines 33 into a temporary storage site located at the input ends of their associated channels 29. With the data for the entire row now deposited in the parallel storage section 25, it is stepped along, a line at a time, in the parallel storage section essentially in the same manner as done in the prior art register 11. As each row of data is thus stepped along, the data for the next row is read in, again in two steps.

At the output end, the process of data transfer from the parallel register to the serial output register 27 is essentially the same as just described for the input end but in reverse. The data in the odd numbered channels are read out at one time into the serial output register and are stepped out serially therefrom and then the data from the even numbered channels are read out into the serial output register and again transferred out serially. It might be said that the serial input and output registers in the two-phase memory of the present invention work "twice as hard" as they do in the memory 11 of the prior art, thus permitting them to be only half as long and hence the parallel storage section 25 to be only half as wide.

Figure 4:
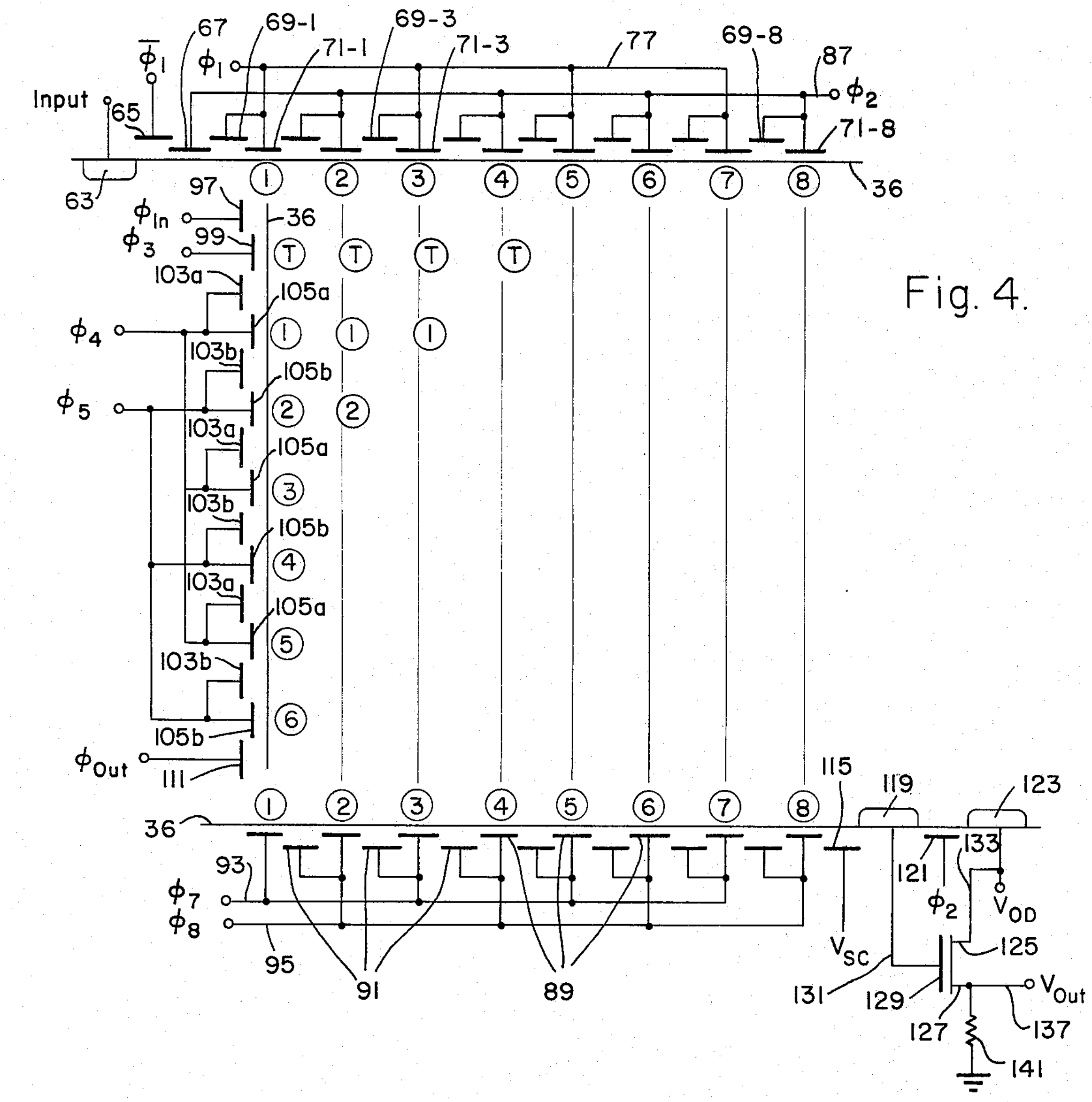
FIG. 4 is a schematic diagram of a CCD serial-parallel-serial memory built in accordance with the present invention.
Figure 6:
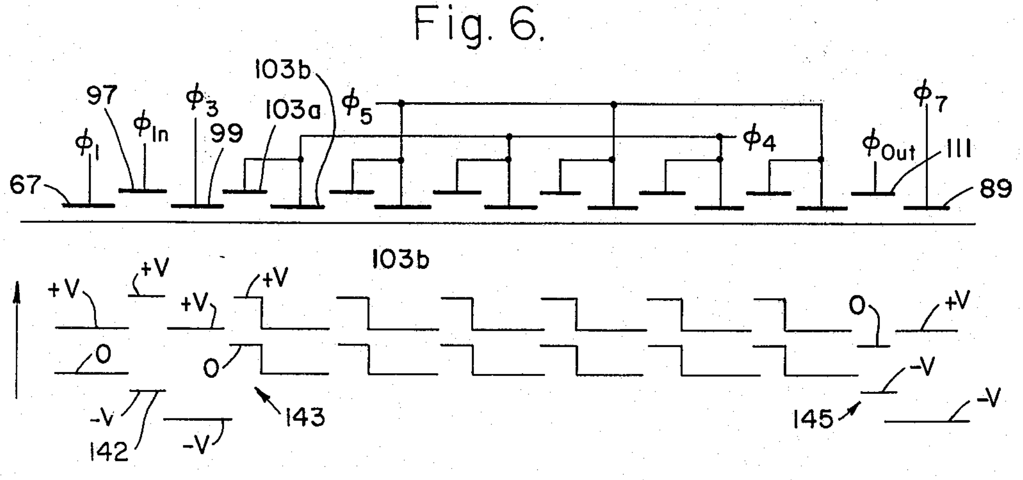
FIG. 6 is a combined schematic diagram of portions of the serial input register, a channel of the parallel storage portion and the serial output register to illustrate the manner in which charge is processed through them.
Figure 7:
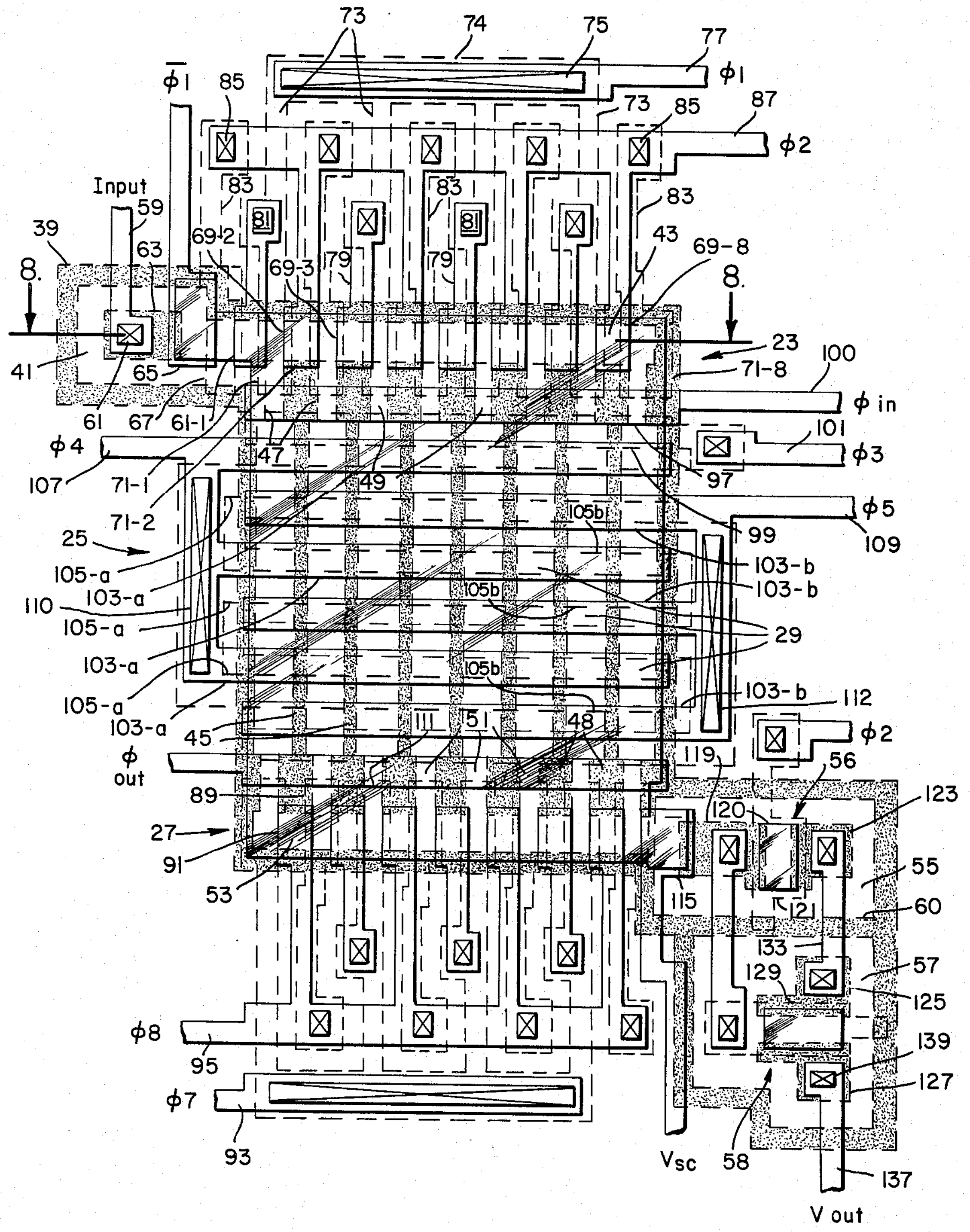
FIG. 7 is a detailed plan view of a serial-parallel-serial surface channel memory built in accordance with the present invention.
Figure 8:
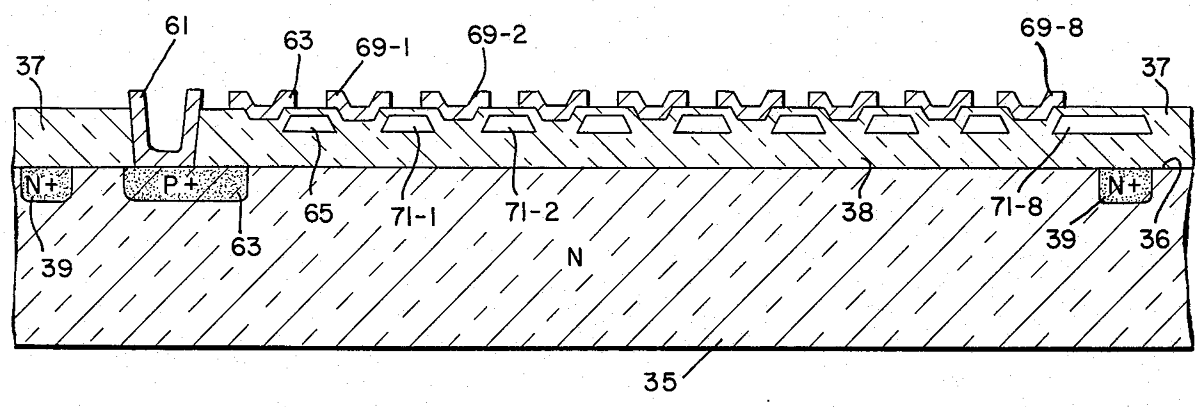
FIG. 8 is a cross section along lines 8—8 through FIG. 7 to illustrate the distribution of surface and buried electrodes in the serial input register.

The precise manner in which the present invention permits the required bit storage capacity of the input and output registers to be cut in half in a two-phase SPS CCD memory by time-sharing them between odd and even channels of the parallel storage will be better understood from the following, more detailed description of the exemplary SPS CCD memory illustrated in FIGS. 4 and 6 schematically and in FIGS. 7 and 8 physically.

As seen in FIGS. 7 and 8, the exemplary SPS CCD memory shown to illustrate a specific application of the present invention is formed in a single chip of N-conductivity type silicon 35 in the top surface 36 of which the active area of the memory is defined by a channel stopper 39 created by increasing the N-type dopant concentration in the surface of the substrate 35. Within the area defined by the outer perimeter of the channel stopper 39 there are several functionally separate regions which communicate with one another so that charge may flow through them in succession. The first of these is an input chamber 41 located toward the upper left-hand corner of the active region of the memory.

Extending horizontally from the charge entry chamber 41 along the top of the memory's active area is an input channel 43 along which charge packets representing data are stepped. From the input channel 43 the data which is momentarily stored therein is transferred into a series of vertical channels 29 which are contained within the central portion of the memory's active region and which are defined by a plurality of parallel partitions 45. The partitions are also channel stoppers and are formed at the same time and in the same manner as the channel stopper 39 which forms the outer perimeter of the memory's active region. The partitions are provided with thickened ends 47 at their top which extend against the bottom side of the input channel 43 so as to define a plurality of transfer ports 49 through which charge may be transferred from the input channel 43 into the parallel channels 29. A similar plurality of transfer ports 51 are defined by the bottom ends 48 of the partitions 45, these ports communicating with a horizontally extending channel 53 in the output register 27 which channel corresponds to the input channel 43 in the input register 23.

Data which have been read into the input shift register channel 43 and then shifted down in parallel along the channels 29 are transferred through the transfer ports 51 into the output register channel 53 from which they are then transferred serially toward the right, into a first output chamber 55 containing a first output FET transistor 56, whose output is used to control a second FET transistor 58 located in an adjacent output chamber 57, separated from the first chamber 55 by a partition 60.

The entire active area of the memory defined by the outer perimeter of the channel stopper 39 is covered by a thin layer of oxide 38, commonly referred to as the "thin oxide." Outside of the active area the oxide is thickened as at 37 and is commonly referred to as the "field oxide." Distributed on top of the thin oxide 38 are the electrodes used to propagate the charge packets through and store the charge packets in the memory. These will now be described in detail. As best seen in FIG. 8, there are two types of electrodes used in the exemplary memory shown in FIG. 7. Those lying at the lowest level will be referred to as "buried" electrodes because, after they are formed on the thin oxide 38, they are covered over by an additional layer of oxide so as to insulate them from the second layer of electrodes which are formed upon that additional oxide and which will be referred to as "surface" electrodes. In the memory to be described, the buried electrodes are formed of doped polycrystalline silicon and the surface electrodes are formed of aluminum.

In the following description of the memory's electrode structure, it will be helpful to refer to FIGS. 4 and 6 in addition to FIGS. 7 and 8.

Charge is injected serially into the memory's entry chamber 41 through an input P+ diffusion 63 to which ohmic contact is made by the metallization 61 which penetrates through the thick oxide 37. The injected charge packets pass under the input electrodes 65 and 67, the first of which overlaps the input diffusion 63. Thereafter, they are clocked along the surface 36 of the silicon substrate by means of the surface electrodes 69 which serve to transfer charge and the buried electrodes 71 which serve to store charge. The particular electrode arrangement illustrated for the input register 23 is by now well known and involves the use of a two-phase clock, the first phase, ($\phi_1$) of which is applied over line 77 to the first and every following odd numbered surface and buried electrode pair 69 and 71, and the second phase ($\phi_2$) of which is applied over line 87 to the second and every even pair of electrodes 69 and 71. More particularly, the $\phi_1$ clock voltage is applied from the bus line 77 through a contact 75 to a buried electrode structure which includes at its bottom end the odd numbered buried storage electrodes 71-1 through 71-7, which have finger-like extensions 73 connected together at a common junction 74 directly under the contact 75. The odd numbered surface electrodes 69-1 through 69-7 are also energized by the $\phi_1$ clock voltage, each by means of a finger 79 which extends down through the field oxide 37 into contact at 81, with the finger-like extension 73 of its corresponding buried electrode 71. To receive $\phi_2$ clock voltage from the bus line 87, each of the even numbered buried electrodes 71-2 through 71-8 is provided with an extension 83 which contacts the $\phi_2$ bus line 87 at points 85 which are distributed along its length. The $\phi_2$ clock voltage is applied to the input buried electrode 67 through an additional contact 86 at the left end of the $\phi_2$ bus line 87.

Charge packets clocked into input register 23 are transferred therefrom through the transfer ports 49 and into the upper ends of the columns 29 by means of a surface input electrode 97 and a buried input electrode 99, both of which extend across all of the parallel channels 29. They are respectively energized from $\phi_{IN}$ and $\phi_3$ bus lines 100 and 101.

Charge packets are stepped along the parallel channels 29 by a set of surface and buried electrodes powered by a two-phase clock in a manner similar to that explained with reference to the input register 23. Extending across the channels 29 from the left toward the right is a first set of three surface electrodes 103*a* with which a second set of surface electrodes 103*b* extending from the right toward the left is interdigitated. Together the electrodes 103*a* and 103*b* form six surface electrodes, each extending across the entire width of the parallel section of the memory, the first, third, and fifth of the electrodes belonging to the group 103*a*, the second, fourth, and sixth electrodes belonging to the second group 103*b*. All members of the first group of electrodes 103*a* are connected in common to a bus line 107 through which they are powered by clock voltage $\phi_4$, and all members of the group 103*b* are connected in common to a bus line 109 through which they are powered by clock voltage $\phi_5$.

Located in offset alignment with the first set of surface electrodes 103*a* is a first set of buried electrodes 105*a*, and a second set of buried electrodes 105*b* is located in similarly offset alignment with the second set of surface electrodes 103*b*. Thus, each of the three buried electrodes 105*a* extends from the left toward the right at a level below that of one of the surface electrodes 103*a*, with the upper edge of the buried electrode 105*a* extending under the bottom edge of the surface electrode 103*a*. Moreover, all of the first set of buried electrodes 105*a* are connected in common through a contact 110 to the $\phi_4$ bus line 107 and similarly all of the second set of buried electrodes 105*b* are connected through a contact 112 to the $\phi_5$ bus line 109. Consequently, as best seen in FIG. 4, there is provided for each parallel channel 27 a set of six electrode pairs, each of which includes a surface electrode 103 and buried electrode 105. Moreover, the first and all odd numbered ones of the electrode pairs are powered by the $\phi_4$ clock, while the second and all succeeding even numbered electrode pairs are energized by the $\phi_5$ clock.

Charges are transferred from the parallel storage section 25 of the memory to the output register 27 through the transfer ports 51 by means of an output electrode 111 spanning all of the ports 51 and receiving a $\phi_{OUT}$ clock voltage through a bus line 113. Once in channel 53 of the output register 27, the charge packets transferred thereinto are stepped along by buried and surface electrodes 89 and 91 which are energized by a two-phase clock ($\phi_7$ and $\phi_8$) from a pair of bus lines 93 and 95 in exactly the same manner as are the electrodes 69 and 71 of the input register 23.

The two-transistor output circuit is the same as that disclosed in detail in U.S. patent application Ser. No. 436,587, filed on Jan. 25, 1974 by John M. Hartmann and Darrell M. Erb assigned to the present assignee, and incorporated herein by this reference and will not be described in detail except to identify its various components as shown schematically in FIGS. 4 and 7. First output transistor 56 includes spaced-apart source and drain diffusions 119 and 123 between which a $\phi_2'$ clocked gate electrode 121 is disposed on top of a layer of gate oxide 120. The charge packets clocked out of the output register 27 are transferred with the aid of a screen electrode 115 into the source diffusion 119 and this charge transfer is detected by the FET transistor 56. The amplified signal is applied to the gate 129 of the second FET output transistor 58 whose drain diffusion 125 is connected over a surface metal bridge 133 to the drain diffusion 123 of the first FET output transistor 56. The circuit of the second FET transistor 58 is completed by the source diffusion 127 which is connected by means of a surface metal contact 139 to the output line 137. A load resistor 141 is also provided between the output line 137 and ground, this being shown schematically in FIG. 4 but not in FIG. 7.

Figure 3A:
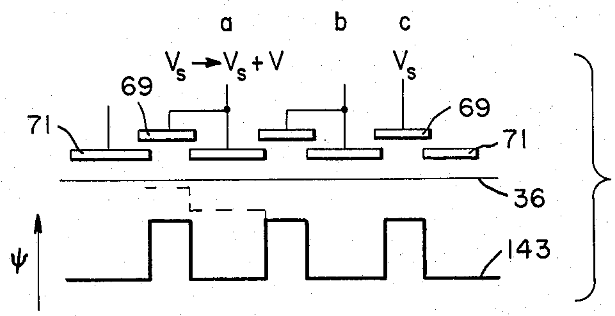
FIG. 3A and 3B are combined cross sectional diagrams and waveforms to illustrate the drop clock and push clock method of charge transfer in a CCD.
Figure 3B:
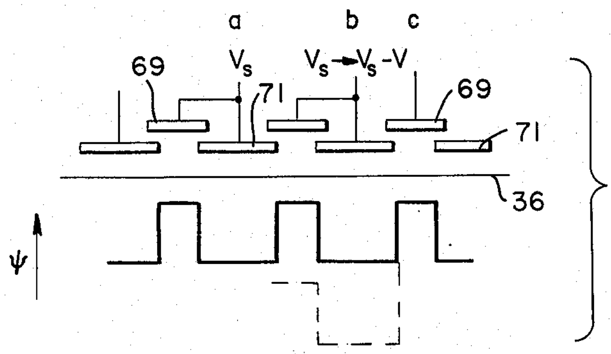
Figure 5:
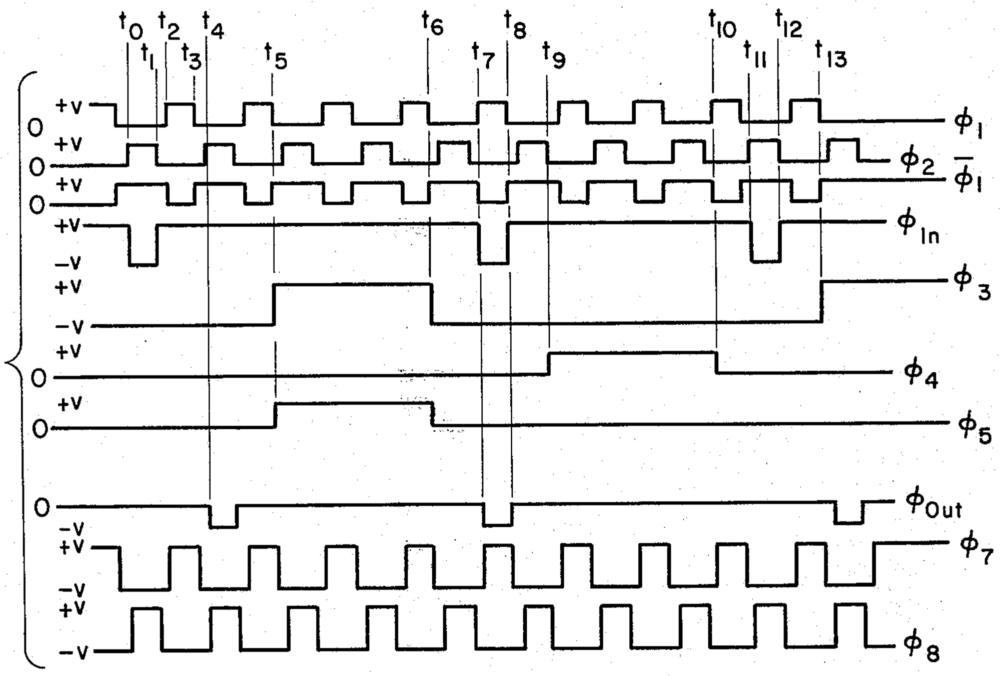
FIG. 5 is a timing diagram showing a set of clocking pulses suitable for processing data through the memory of FIG. 4.

In understanding the operation of the memory of the present invention which will be explained next, it will be helpful to first understand the two methods of charge transfers that are involved. These are illustrated in FIGS. 3*a* and 3*b*. FIG. 3*a* illustrates the "push clock" charge transfer method. Two conditions are illustrated in FIG. 3*a*. During the first condition charge is being stored under the storage electrode 71 at location *a*. Potential wells, as illustrated by depletion region boundary line 143, are maintained under all of the storage electrodes 71 by the application of potentials to the storage and transfer electrodes 71 and 69 so as to maintain a relatively high negative surface potential under the storage electrodes 71 as compared to those under the transfer electrodes 69. In the push transfer mode, charge is shifted from the storage electrode 71 at location *a* by raising the voltage applied to that electrode and its associated transfer electrode 69 from a given potential (shown as $V_S$) to a less negative potential (shown as $V_s + V$). This raises the potential well to a level which is slightly higher than the depletion region under the transfer electrode 69 to its immediate right in location *b*. Consequently, a descending stair configuration exists in the depletion region, progressing from the transfer electrode 69 through the storage electrode 71, both in location *a*, through the transfer electrode 69 in location *b* to the storage electrode 71 in location b; and the charge is thus "pushed" down the stair step into the lowest portion thereof. This push transfer is completed when the voltage being applied to the electrodes 69 and 71 at location *a* is returned to its previous storage level $V_S$, causing the transferred charge to become captured at the storage well under the storage electrode 71 in location *b*. Transfer of this charge from location *b* to location *c* to its immediate right is brought about by changing the potential being applied to the electrode structure at location *b* in the same way as was done for the electrode structure in location in the preceding time period.

In the drop clock charge transfer scheme, a descending stair potential configuration is developed not by raising the potential of the electrode under which charge is being stored but by dropping the potential applied to the electrode into whose storage well the charge is to be transferred. Thus, the potential gradient in the semiconductor wafer during the storage mode is seen to be the same in FIG. 3b as it was in FIG. 3a. The only difference is in the clocking voltage which is being applied to the electrodes during transfer of charge.

The clocking of signals serially into the entry chamber 41 through the diffusion 63 is under the control of the clock voltages $\phi_1$ and $\phi_1$ which are applied respectively to the surface input electrode 65 and the buried input storage electrode 67 of the serial input register 23. Each time the $\overline{\phi_1}$ clock goes from +V to 0, an incoming charge packet is deposited under the input storage electrode 67; and each time $\phi_1$ goes from 0 to +V, that charge packet is transferred to the storage electrode 71-1 to its immediate right into the No. 1 storage site of the input register 23. More particularly, every time when $\phi_2$ drops to its low potential (0 volts) as shown at time $t_1$, all of the storage electrodes 71 which are connected thereto (the even numbered ones 71-2, 71-4, etc.) go into their storage mode, in which potential wells in the form of depressed depletion regions as shown in FIGS. *3a* and *3b* are formed under them. When shortly thereafter at time $t_2$, $\phi_1$ goes positive, all storage electrodes energized by it over the line 77 have their potential raised, causing their potential wells to be lifted and their stored charges to be "pushed" to the storage sites to their immediate right. By the time $t_3$ when $\phi_1$ returns to 0, the charge packets which had been stored at the odd numbered locations will be in the even numbered ones. At the same time, $\phi_1$ having returned to its 0 volt potential, the odd numbered storage sites are again in a condition to receive a charge packet. This occurs at time $t_4$ when $\phi_2$ goes to its +V potential level and pushes the charge packets out of the even numbered storage sites into the odd numbered ones.

Between the times $t_0$ and $t_6$ charge packets will have been clocked through the input diffusion 63 into storage sites No. 1, 3, 5, and 7 of the input register 23. At time $t_7$, one more charge packet is read in, accompanied by one more shift to the right in the input register 23, bringing charge packets into storage sites No. 2, 4, 6, and 8 in the input register. As the charge packets are flowing into storage sites No. 2, 4, 6, and 8 in the input register, $\phi_{IN}$ is dropped at the time $t_7$ from +V to −V. This, in combination with the previously dropped $\phi_3$ clock voltage (to −V at the time $t_6$) establishes a descending stair depletion region gradient from the even numbered storage sites to the lowest step of the gradient which will be under the buried input electrode 99 which extends across the top of the parallel storage section 25. This voltage gradient, and those which will be referred to later, may be seen by referring to FIG. 6. A composite of the electrodes which are disposed over the first channel 29 of the parallel storage section and of the electrodes which are disposed over the input and output register storage sites which are adjacent to that channel, FIG. 6 may be considered to be a schematic cross section through the first column of the parallel storage section and through the serial input and output registers which are in line with that column. Drawn under that cross section are a series of waveforms which represent, for each of the illustrated electrodes, the depth of the depletion region underneath that electrode for each of the two voltage levels which might be applied thereto. Thus, the descending stair depletion region gradient, which is brought about when $\phi_1$, $\phi_{IN}$, and $\phi_3$ are all at their lowest potentials, may readily be observed at 142.

Following the transfer of charge packets from the even numbered storage sites of the input register to the temporary storage sites marked T which exist under the buried input electrode 99, $\phi_{IN}$ is quickly returned at time $t_8$ to +V, creating a potential barrier between the temporary storage sites T in the parallel storage section 25 and the storage sites in the serial input register 23. This captures the transferred charges in the temporary storage sites T and provides the necessary isolation between the parallel and serial registers 25 and 22 to permit immediate resumption of the read-in of further charge packets into the input register.

Beginning at time $t_8$, charge packets are clocked into the input register 23 and are advanced so as to bring them into storage sites 1, 3, 5, and 7. At time $t_{11}$, charges are being entered into those storage sites, $Q_{IN}$ is again dropped from +V to −V so as to again establish the descending stair depletion region boundary contour from the storage sites in the serial input register to the temporary storage sites T in the parallel storage section 25, causing the charge packets to flow into the even numbered ones of those storage sites. Upon completion of the transfer at time $t_{12}$, all of the eight charge packets which had been read into the input register during the two clockings at $t_7$ and $t_{11}$ will be stored in the eight temporary storage sites T under the buried input electrode 99.

Continuing with the explanation of what happens to the eight charge packets which have been transferred into the temporary storage sites T at the top of the parallel storage section 25, they are next transferred from those temporary storage sites to the first set of storage sites, indicated by the circled numeral 1 which is the next succeeding row following the temporary storage sites T. For this purpose, $\phi_4$ was previously dropped at time $t_{10}$ from +V to 0 in order to establish potential wells at the No. 1 storage sites in the parallel storage section. Transfer occurs when, at time $t_{13}$, $\phi_3$ is raised from −V to +V. With $\phi_3$ at +V and $\phi_4$ at 0 volts, the necessary descending stair depletion region boundary is established (see FIG. 6 at 143) and charge packets are transferred from all eight temporary storage sites T into the No. 1 storage sites under the first storage electrode 105*a* of the parallel storage section.

A shift to the No. 2 storage sites, located under the topmost of the set of storage electrodes marked 105*b*, occurs when $\phi_4$ goes positive. This, in turn, will take place at a time, corresponding to $t_9$, just prior to the transfer of the next set of charge packets from the serial input register 22 to the parallel storage section 25. These charge packets are shifted from the No. 2 storage sites to the No. 3 storage sites in the parallel section 25 by raising the potential of $\phi_5$ from 0 to +V, shortly before charges are shifted from the No. 1 storage sites to the No. 2 storage sites of the parallel storage section 25. In other words, charge packets are periodically shifted from the No. 2 storage sites to the No. 3 storage sites in the parallel storage section so as to vacate the No. 2 storage sites periodically. Thereafter, charges are shifted into the just vacated No. 2 storage sites from the No. 1 storage sites (as at $t_9$) vacating them. Thereafter, the charges which have been temporarily held at the temporary storage sites T are dumped into the No. 1 storage sites (as at time $t_{13}$). Finally, with the temporary storage sites vacated, first the even and then the odd numbered storage sites in the input register may be dumped into the temporary storage sites T.

As each set of charge packets arrives in the last row of storage sites, labeled with the circled 6 in FIG. 4, it is transferred to the output register 27 in two steps, each being marked by $\phi_{OUT}$ going from 0 to −V. Each time this occurs, a descending stair configuration is created (see FIG. 6 at 145) between the No. 6 storage sites and those storage sites in the output register whose clock is at the −V level. Alternate ones of the $\phi_{OUT}$ pulses are made to occur when $\phi_7$ and $\phi_8$ respectively are at −V so that charge packets are read alternately from odd and even numbered ones of the channels 29 of the parallel storage section 25. Thus, at time $t_4$ the odd numbered column contents are clocked out of the No. 6 storage site location into the serial register and are clocked out therefrom during time $t_4$ through $t_{13}$, and then at time $t_7$ the even numbered columns have their corresponding charge packets transferred to the serial output register and clocked out therefrom next eight $\phi_8$ clock periods.

Referring next to the reading out serially of charges from the output register 27 by means of the output FET transistors 56 and 58, it might be noted that the potential $V_{SC}$ which is being applied to the output screen electrode 115 of the output register should be selected so that the resulting surface potential under the electrode 115 will be between the potential at the junction of the source diffusion 119 and the surface potential under the last storage electrode 89. This will insure that charges will flow from the potential well under that storage electrode to the junction of the source diffusion 119 when $\phi_8$ is raised to +V. An output signal is generated at the output terminal 137 each time a charge packet is transferred from the last storage site (site No. 8) of the output register into the source diffusion 119. A more detailed explanation of the exact manner in which this occurs is given in the above-referenced Hartman-Erb application Ser. No. 436,587.

From the above detailed description of the invention as applied to a two-phase input register, it can be seen how the technique of interlacing reduces the number of storage sites required in the input register for a given number of columns in the parallel storage section. In the case where a two-phase clock is used as illustrated, the reduction is by 50%. This is so because, had interlacing not been used with the structure illustrated in FIG. 4 and had the charge packets been clocked into the input register in exactly the same manner, bringing them to a stop in the input register at the same place every time, the charge packets would have become stored prior to transfer to the parallel storage section at alternate ones of the eight storage sites illustrated for the serial input register. The invention is, however, not limited to application to an SPS CCD memory having a two-phase input register. Thus, if a three-phase input register is assumed, so that at any given time charge packets are stored at every third site situated under every third storage electrode, then in keeping with the present invention, charge packets which are to be stored in each row of the parallel storage section would be clocked into the input register in three stages. Assuming for sake of illustration a nine-column parallel storage section, there would first be clocked into the input register the charge packet destined for the ninth, sixth, and third columns. Next would come the charge packets destined for the eighth, fifth, and second storage columns; and finally would come the charge packets destined for the seventh, fourth, and first storage columns of the parallel storage section.

Figure 9:
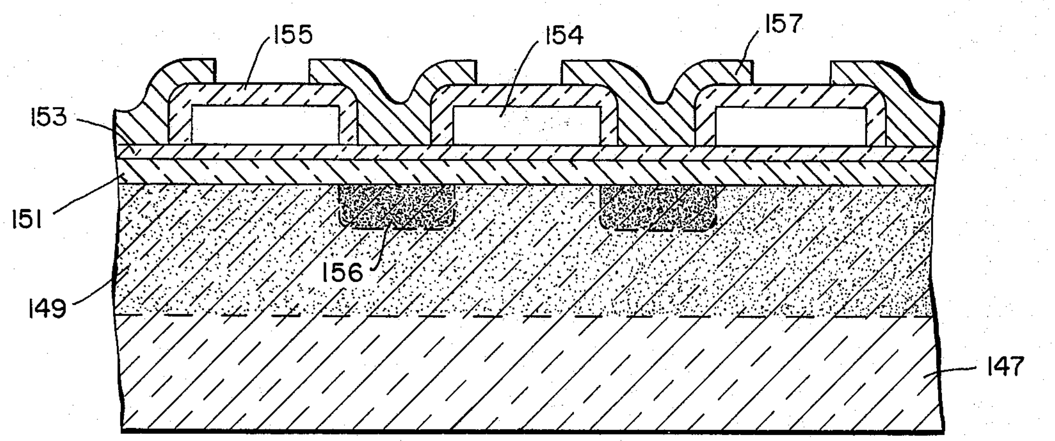
FIG. 9 is a cross section through an alternate type of CCD input register in which charge is processed beneath the surface of the semiconductor substrate.

A preferred alternative to the surface channel CCD construction described with reference to FIGS. 1–8 is a buried channel CCD construction such as that illustrated in FIG. 9. The advantages of a buried channel CCD over a surface channel CCD are well known and are described in the above-referenced Krambeck U.S. Pat. No. 3,739,240, as well as in an article entitled "An Overlapping-Electrode Buried Channel CCD" by Erb, Kotyczka, Su, Wang, and Clough, published in Proceedings of the International Electron Devices Meetings, Washington, D.C., December, 1973, pgs. 24–26. In the referenced article the buried channel CCD illustrated in FIG. 9 is described in some detail along with experimental results obtained therewith. Suffice it to say here that the principal advantages of using the buried channel CCD construction illustrated in FIG. 9 are transfer efficiency and elimination of the requirement to work with an artificially high ambient charge level commonly referred to as a "fat zero."

The buried channel CCD shown in FIG. 9 is constructed by implanting boron in or forming an epitaxial layer on an N-type substrate 147 so as to form a lightly doped P-type layer 149. A layer of thermal oxide 151 is grown on the P layer 149, followed by deposition of a silicon nitride layer 153. Thereafter, a set of polycrystalline silicon storage electrodes 154 is deposited and etched. To effect two-phase CCD operation, the wafer is next implanted with an N-type impurity to partially compensate or counterdope the P-type layer 149 in the areas 156 which are not masked by the polycrystalline silicon electrodes 154. The device is then thermally oxidized to form an oxide layer 155 over the polycrystalline silicon electrodes 154. The nitride layer 153, although exposed in the interelectrode gaps, resists oxidation and does not get thicker. Finally, a layer of aluminum is deposited and etched to produce the transfer electrodes 157.

It may be seen from the foregoing that there has been brought to the art of CCD memories an organization which, when used with SPS CCD memory systems, can result in cutting to a fraction the size of the memory. The technique of interlacing which characterizes the invention may be used to advantage with two or higher phase memories and may be incorporated either in surface channel or buried channel structures, although the latter are preferred.

What is claimed is:

1. In a CCD memory, the combination comprising:

a. a parallel CCD storage register having R channels, each channel for storing a plurality of information-bearing charge packets;

b. a serial CCD input register having one storage site for each of said R channels;

c. means for alternately clocking into said serial CCD input register charge packets to be stored in even and odd numbered ones of said R channels so that a first group of charge packets to be stored in even numbered channels are clocked into a first set of alternate storage sites in said serial CCD input register and a second group of charge packets to be stored in odd numbered channels are clocked into a second set of storage sites which alternate with said first set of storage sites; and d. means for transferring into said R channels the charge packets previously clocked into said first and second sets of storage sites; and e. means for concurrently stepping along said R channels the charge packets previously transferred thereto.

2. The combination of claim 1 characterized further in that said serial CCD input register comprises a semiconductive storage medium, having a dielectric layer disposed over said surface and a series of electrode structures distributed above said surface, each electrode structure having a metal electrode member on the surface of said dielectric layer and a doped semiconductor electrode member buried in said dielectric layer.

3. The combination of claim 2 characterized further in that said doped semiconductor member is polycrystalline silicon, said substrate is silicon, said insulating layer is silicon dioxide and said metal electrode member is aluminum.

4. The combination of claim 1 characterized further by:

a. means external of said input register for temporarily storing each group of charge packets after it is clocked into said input register; and b. means for transferring each group of charge packets out of said input register and into said temporary storage means.

5. The combination of claim 4 characterized further in that said temporary storage means is comprised of a storage site at the input end of each said R channels.

6. A CCD memory comprising in combination:

a. a parallel CCD storage register having R channels, each channel having a linearly extending series of storage sites for storing a plurality of information-bearing charge packets;

b. a serial CCD input register having one storage site adjacent the input end of each of said R channels;

c. a serial CCD output register having one storage site adjacent the output end of each of said R channels;

d. means for alternately clocking into said serial CCD input register respective groups of charge packets to be stored in even and odd numbered ones of said R channels;

e. means for transferring to the input end of a respective one of said R channels each charge packet previously clocked into said input register;

f. means for concurrently stepping said transferred charge packets from the input ends of said channels toward their output ends;

g. means for transferring said charge packets upon their arrival at the output ends of said R channels to respective ones of the storage sites in said output register; and h. means for reading out of said output register the charge packets previously transferred thereinto.

7. The memory of claim 6 characterized further in that said memory is formed on the surface of a semiconductive wafer, the outer perimeters of said input, output, and parallel registers being defined by a common circumferential channel stopper diffused into said surface, individual ones of said R channels being defined by a plurality of parallel channel stoppers diffused into said surface and extending within said common channel stopper from said input register to said output register.

8. The memory of claim 7 characterized further in that said semiconductive wafer is covered by a dielectric layer and said parallel register includes two sets of interdigitated metal transfer electrodes on the surface of said dielectric layer and two sets of interdigitated storage electrodes buried within said dielectric layer, each electrode spanning all of said R channels.

9. The memory of claim 7 characterized further in that said input and output registers each include a plurality of storage electrodes, respective storage electrodes of said input register extending over the input ends of corresponding ones of said R channels and respective storage electrodes of said output register extending over the output ends of corresponding ones of said R channels.

10. A CCD memory in accordance with claim 9 characterized further in that:

a. each of said R channels includes a temporary storage site at its input end for holding a charge packet prior to its being stepped along said channel, and b. said means for transferring charge packets to the input end of said R channels are operative to transfer the respective groups of charge packets into said temporary storage sites separately, each before the other group has been clocked into said input register.

11. In a serial-parallel-serial CCD memory, the combination comprising:

a. a serial CCD input register having a plurality of linearly extending storage sites, each defined by a separate storage electrode member;

b. a parallel CCD storage register having a separate charge channel extending from and communicating at its top end with each of said storage sites;

c. a serial CCD output register having a plurality of storage sites linearly extending parallel to those of said input register, each storage site of said output register communicating with the bottom end of a respective one of said charge channels;

d. means for serially reading data into successive interlaced sets of said storage sites; and e. means for separately transferring data from respective ones of said interlaced sets of storage sites to said parallel CCD storage register.

12. The combination of claim 11 characterized further in that the storage sites of said serial input register comprise two interlaced sets of storage sites into which data are read alternately.

13. In a serial-parallel-serial CCD memory the combination comprising:

a. a serial CCD input register having a set of linearly extending storage sites, each defined by a separate storage electrode member;

b. a parallel CCD storage register having separate charge channels individually extending from and communicating with respective ones of said storage sites, each said channel having a column of storage sites, with corresponding sites of the respective channels forming successive rows of storage sites;

c. a serial CCD output register having a set of linearly extending storage sites individually adjacent to and communicating with, respective ones of said charge channels;

d. means for serially clocking into said input register N sets of charge packets in succession, each set of charge packets being clocked into a different subset of said input register storage sites, with individual members of the respective subset of storage sites being interlaced;

e. means for transferring the charge packets stored in said input register into the first of said rows of storage sites;

f. means for clocking charge packets along said channels toward said output register;

g. means for transferring charge packets from said parallel register storage sites to said output register; and h. means for serially clocking charge packets from said output register.

* * * * *